United States Patent [19]

Mizoguchi

[11] Patent Number: 4,802,079
[45] Date of Patent: Jan. 31, 1989

[54] PWM CONTROL APPARATUS FOR INTERPHASE REACTOR MULTIPLEX INVERTER

[75] Inventor: Shoji Mizoguchi, Hyogo, Japan

[73] Assignee: Mitsubishi Denki Kabushiki Kaisha, Tokyo, Japan

[21] Appl. No.: 162,900

[22] Filed: Mar. 2, 1988

[30] Foreign Application Priority Data

May 15, 1987 [JP] Japan ............................... 62-119672

[51] Int. Cl.⁴ ............................................. H02M 1/08
[52] U.S. Cl. ........................................ 363/71; 363/41; 363/79
[58] Field of Search ........................ 363/41, 64, 71, 72, 363/79

[56] References Cited

U.S. PATENT DOCUMENTS 4,549,258 10/1985 Honbu et al. ......................... 363/71

FOREIGN PATENT DOCUMENTS 22385 2/1985 Japan ..................................... 363/71

OTHER PUBLICATIONS

Tsuchiya et al, "Parallel Running of GTO PWM Inverters," Elect. Eng. in Japan, vol. 104, No. 3, pp. 30-39, 1984.

Primary Examiner—William H. Beha, Jr.
Attorney, Agent, or Firm—Bernard, Rothwell & Brown

[57] ABSTRACT

A PWM control apparatus for an interphase reactor multiplex inverter in which the load current in each phase output from the midpoint of each of the interphase reactors is quickly controlled by feedback control with a signal corresponding to the sum of the output currents of the inverters in the same phase, the voltage command value for each phase of each inverter is corrected with a signal corresponding to the difference between output currents of the inverters in the same phase (proportional to the circulating current), whereby the interphase voltage difference developed across the interphase reactor in each phase is quickly controlled and the circulating current in each phase is controlled to become extremely small.

5 Claims, 6 Drawing Sheets

FIG. 7

| Sua | Sub | Vua | Vub | Vuc | Vu | 108a | 109a | 108b | 109b |
|---|---|---|---|---|---|---|---|---|---|
| 0 | 0 | 0 | 0 | 0 | 0 | OFF | ON | OFF | ON |
| 0 | 1 | 0 | Ed | -Ed | Ed/2 | OFF | ON | ON | OFF |
| 1 | 0 | Ed | 0 | Ed | Ed/2 | ON | OFF | OFF | ON |
| 1 | 1 | Ed | Ed | 0 | Ed | ON | OFF | ON | OFF |

PWM CONTROL APPARATUS FOR INTERPHASE REACTOR MULTIPLEX INVERTER

BACKGROUND OF THE INVENTION

1. Field of the Invention

The present invention relates to a PWM control apparatus for an interphase reactor multiplex inverter in which output terminals of two inverters are connected with each other through interphase reactors so as to provide parallel multiplex three-phase output from the midpoints of the interphase reactors, and more particularly, to a control technique of the circulating current which flows through each interphase reactor to circulate between two inverters.

2. Description of the Prior Art

FIG. 1 shows a main circuit of an interphase reactor multiplex GTO PWM inverter described, for example, in a paper, No. 59-B28, entitled "Parallel Operation of GTO PWM Inverters", Transactions of Japan Society of Electric Engineers, Vol. 104, Part B No. 4, April 1984. In the figure, reference numeral 1 denotes a D.C. voltage source, 2a–7a and 2b–7b denote circulation diodes each pair thereof connected in series being connected in parallel with the D.C. voltage source 1, and 8a–13a and 8b–13b denote GTOs (gate turn-off thyristors) connected in parallel with the circulation diodes 2a–7a and 2b–7b to constitute a first inverter INV. a and a second inverter INV. b. Reference numerals 14–16 denote interphase reactors connecting output terminals of the inverters INV. a and INV. b with each other, and 17 denotes a load obtaining a parallel multiplex three-phase output from the midpoints of the interphase reactors 14–16.

FIG. 2 shows a control circuit for the main circuit of FIG. 1, wherein 18a, 18b denote oscillators, 19a, 19b denote frequency dividers, 20a, 20b denote triangular carrier generators, 22a, 22b denote local processors for generating a three-phase reference wave for pulse width modulation (PWM) of each inverter, 21 denotes a supervisory processor for controlling the local pocessors 22a, 22b, 23a–25a and 23b–25b denote comparators comparing the triangular carrier with the reference wave for generating a PWM firing signal for each of the GTOs 8a–13a and 8b–13b, 26a–28a and 26b–28b denote waveform shaping circuits suppressing the generation of narrow pulses, and 29 denotes a feedback signal for phase and amplitude of the circulating currents $i_{uc}$, $i_{vc}$, and $i_{wc}$ passing straight through the interphase reactors in FIG. 1.

Now, operations in the aforementioned circuit will be described. Since the first inverter INV. a and the second inverter INV. b in FIG. 1 are identical to each other, the operations only for the first inverter INV. a will be described.

First, the clock as the output of the oscillator 18a is counted by a U/D (up/down) counter (not shown) within the triangular carrier generator 20a, whereby a triangular wave signal $e_c$ as shown in FIG. 8 is generated to be supplied to the comparators 23a–25a.

Meanwhile, the output of the oscillator 18a is divided for its frequency by the frequency divider 19a and input to the local processor 22a as a signal for the phase of the fundamental wave of the output phase voltage. In the local processor 22a, a sine wave table stored in a ROM is read out with the aforesaid signal for the phase of the fundamental wave used as the address, whereby a three-phase sine wave signal $e_a$ is generated to be output therefrom.

The comparators 23a–25a compare, as shown in FIG. 3, the triangular wave signal $e_c$ with the sine wave signal $e_a$ thereby to generate PWM firing signals $S_a$.

The PWM firing signals $S_a$ are passed through the waveform shaping circuits 26a–28a, whereby narrow pulses not connected with pulse width modulation are eliminated therefrom, and turned to firing signals $U_a$, $V_a$, and $W_a$ for the GTOs 8a, 10a, and 12a. Although firing signals for the GTOs 9a, 11a, and 13a are $\overline{U_a}$, $\overline{V_a}$, and $\overline{W_a}$ which are negative logic signals of $U_a$, $V_a$ and $W_a$, they are not shown for the sake of simplification.

In the prior art example of FIG. 2, with the aim to achieve a redundant system for enhancement of reliability on the circuit, an individual control system is adopted, that is, the first and second inverters INV. a, INV. b are respectively operated by their individual oscillators 18a, 18b and control circuits.

Since the first and second inverters INV. a, INV. b are individually controlled as aforesaid, amplitudes and phases of the fundamental waves of the voltages generated in each phase of both the inverters become different from each other, and as a result, circulating currents $i_{uc}$, $i_{vc}$, and $i_{wc}$ as shown in FIG. 1 are caused to flow through each interphase path.

Amplitude and phase of the circulating current through each phase is fed back to the supervisory processor 21 as a feedback signal 29, and, responding thereto, the supervisory processor 21 outputs control commands to both the local processors 22a, 22b for the INV. a, INV. b such that amplitude and phase of the voltage command value (reference wave) for each phase are controlled to decrease the circulating current in each phase.

By virtue of the above described control operations, the loads shared by the inverters INV. a, INV. b can be well balanced.

Since the prior art PWM control circuit for interphase reactor multiplex inverter has been structured as described above, there have been such problems that larger interphase reactors are required for keeping the balance between the currents shared by each phase of the inverters, having different oscillation frequencies, multiplexed in the aim to obtain larger capacity, but the same cannot be used for high-speed controlling of the output currents, and further, the configuration of the control circuit becomes complex.

SUMMARY OF THE INVENTION

The present invention was made to solve the above mentioned problems, and accordingly, a primary object of the present invention is the provision of such a PWM control apparatus for an interphase reactor multiplexed inverter which is operable with smaller interphase reactors, enables the load current, i.e., the output current therefrom to be quickly controlled, needs only a simplified control circuit, and is not costly.

To achieve the above mentioned object, the PWM control apparatus for an interphase reactor multiplexed inverter according to the present invention comprises generation means of common phase voltage command value for generating phase voltage command value (PWM reference wave) common to both of the inverters based on the sum of output currents of two inverters in the same phase, generation means of individual phase voltage command value for generating phase voltage command value for each inverter based on the difference between the aforementioned output currents in each phase and adding to or subtracting from the aforesaid common phase voltage command value a correction signal having the value proportional to the current difference signal (circulating current) in the direction to reduce the current difference signal, and firing signal generation means for generating a firing signal for each inverter based on a triangular carrier common to both of the inverters and the aforesaid individual phase voltage command value.

Other objects and advantages of the present invention will be apparent from the following detailed description with reference to the accompanying drawings.

BRIEF DESCRIPTION OF THE DRAWINGS

FIG. 7 is a table showing relationship between switching state functions of the switching elements in FIG. 5 and various quantities.

DESCRIPTION OF THE PREFERRED EMBODIMENT

Figure 1:
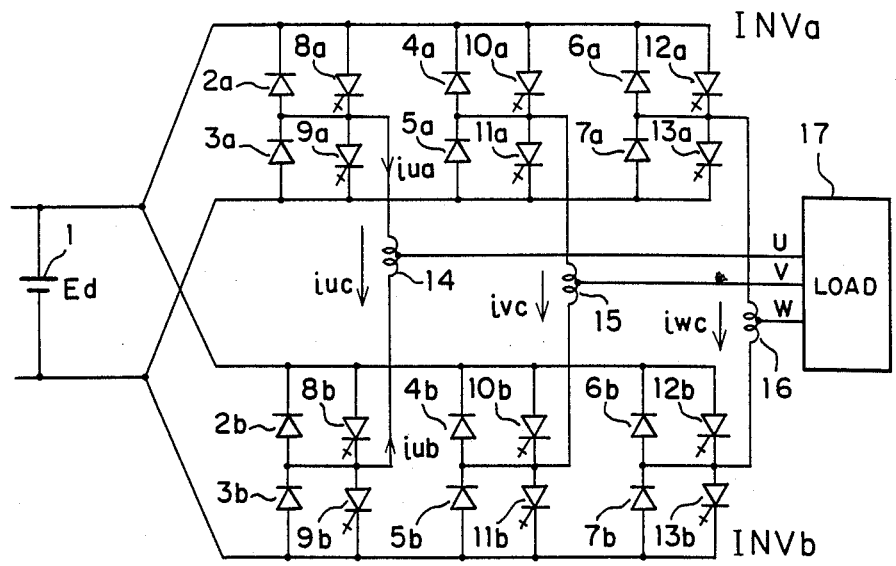
FIG. 1 is a diagram showing configuration of a prior art PWM control apparatus for an interphase reactor multiplex GTO inverter.
Figure 2:
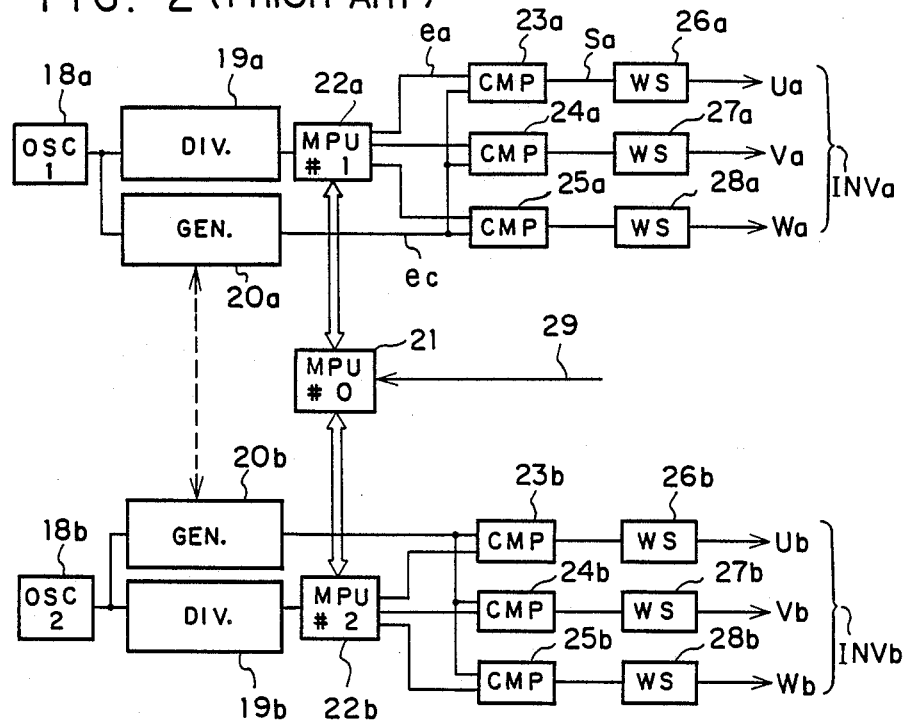
FIG. 2 is a block diagram showing a control circuit for the inverter FIG. 1.
Figure 3:
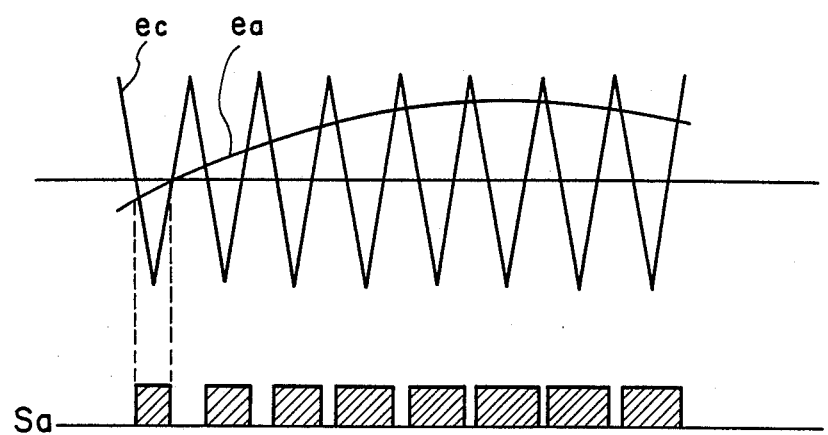
FIG. 3 is an explanatory diagram of the operation for the triangular carrier comparison pulse width modulation.
Figure 4:
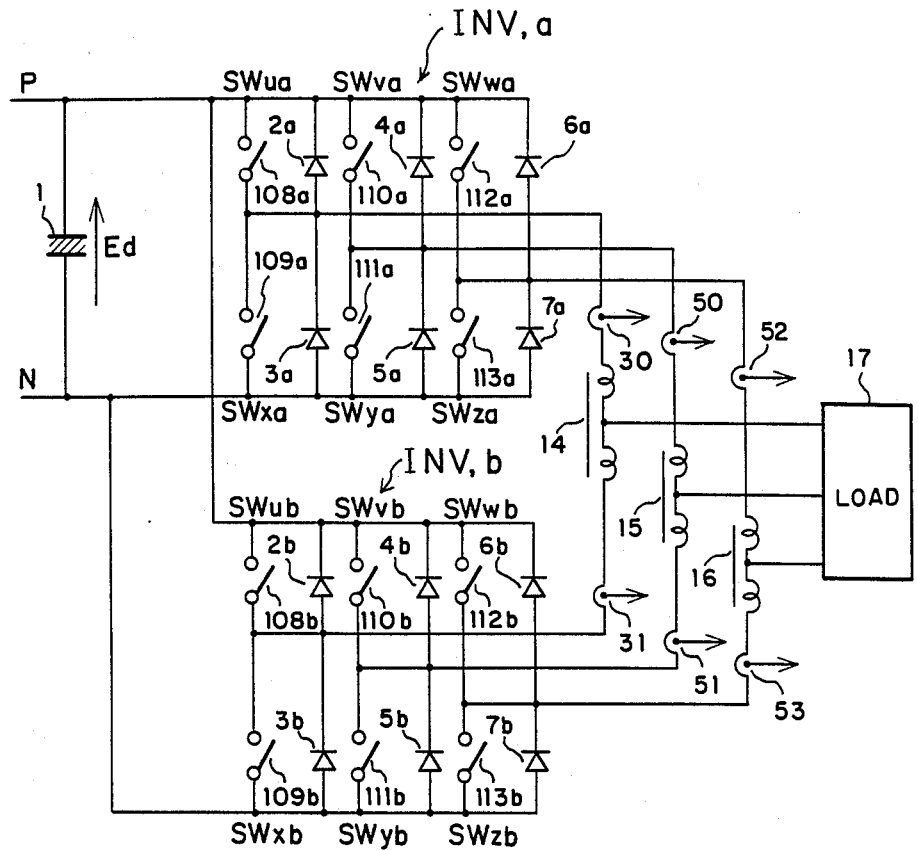
FIG. 4 is a diagram showing configuration of a PWM control apparatus for an interphase reactor multiplex three-phase inverter according to an embodiment of the present invention.

An embodiment of the present invention will be described with reference to FIG. 4 and, in which like or corresponding parts to those in FIG. 1 are denoted by like reference numerals. Referring to FIG. 4, 108a–113a and 108b–113b denote switches provided in exchange for the GTOs 8a–13a and 8b–13b in FIG. 1.

Figure 5:
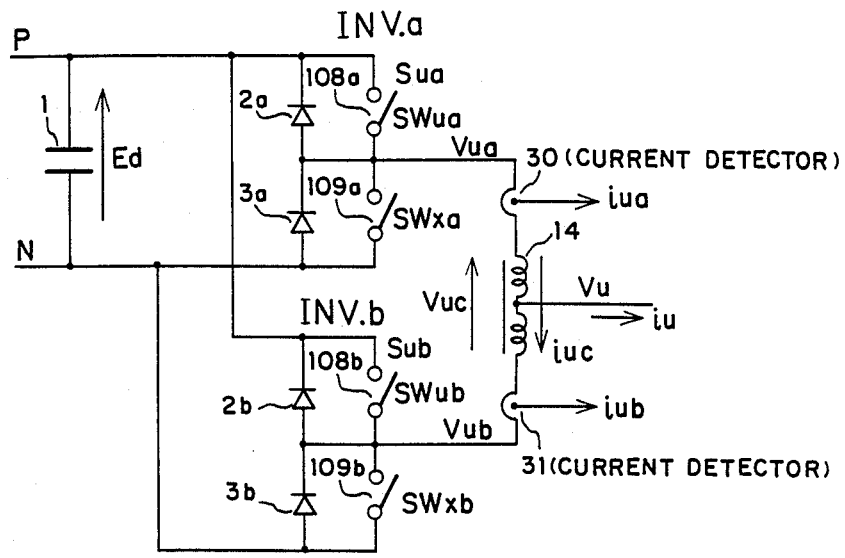
FIG. 5 is a circuit diagram for the phase U extracted from FIG. 4.

Referring to FIG. 5, which shows only the phase U extracted from FIG. 4, 30 and 31 denote current detectors of the phase-U output currents of the first and second inverters INV. a and INV. b. Similar current detectors are also required for other phases (phase V and phase W).

Figure 6:
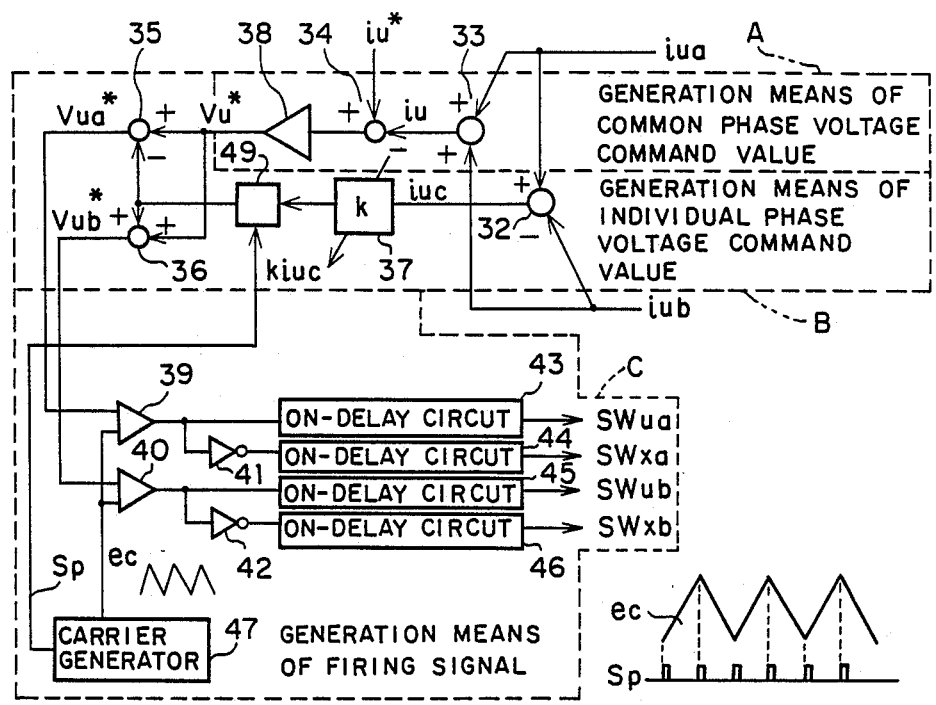
FIG. 6 is a circuit diagram of a control circuit only for the phase u of FIG. 5.

Referring to FIG. 6, which shows te phase-U current control circuit for the first and second inverters INV. a and INV. b., 32, 34, and 35 denote subtractors, 33 and 36 denote adders, 37 denotes a gain control, and 38 denotes an amplifier.

Reference numerals 39 and 40 denote comparators for comparing the triangular carrier $e_c$ with the reference waves $V_{ua}^*$ and $V_{ub}^*$, 41 and 42 denote negative logical elements, 43–46 denote on-delay circuits for preventing arms from shorting, 47 denotes a generator of triangular carrier $e_c$, $S_p$ denotes a one-shot signal in which pulse rises are generated at crests and troughs of the triangular carrier $e_c$, and 49 denotes a sample and hold for sampling and holding the output $ki_{uc}$ of the gain control 37 at the rise of the one-shot signal $S_p$.

In the illustrated case, the adder 33, subtractor 34, and the amplifier 38 constitute generation means A of the common phase voltage command value, the subtractor 32, gain control 37, sample and hold 49, subtractor 35, and the adder 36 constitute generation means B of individual phase voltage command value, and the comparators 39, 40, negative logical elements 41, 42, on-delay circuits 43–46, and the generator 47 of the triangular carrier $e_c$ constitute generation means C of the firing signal.

FIG. 7 is a table showing output phase voltages $V_{ua}$, $V_{ub}$ of the first and second inverters INV. a, INV. b seen from the point N in FIG. 5, the voltage $V_{uc}$ developed across the interphase reactor, and the phase voltage $V_u$ applied to the load as against phase switching states of the switches 108a, 109a, 108b, and 109b represented by $S_{ua}$ and $S_{ub}$ for INV. a and INV. b, respectively.

Figure 8:
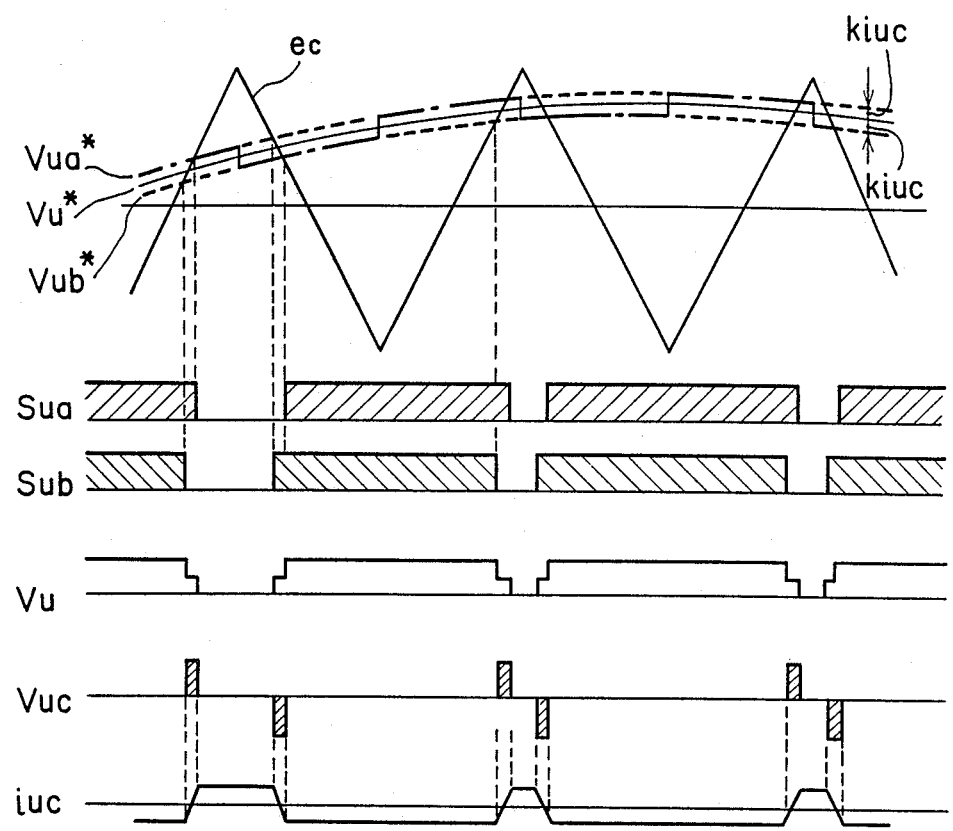
FIG. 8 is a signal waveform chart for explaining operations.

FIG. 8 is an explanatory diagram of the operations in the comparators 39 and 40 comparing the reference waves $V_{ua}^*$ and $V_{ub}^*$ in FIG. 6 with the triangular carrir $e_c$.

Now, the operations will be described with reference to FIG. 5 to FIG. 8. As shown in FIG. 5, the phase-U output currents $i_{ua}$ and $i_{ub}$ of the first inverter INV. a and the second inverter INV. b are detected by the detectors 30 and 31, respectively, and the load current $i_u$ as the sum of the currents and the circulating current $i_{uc}$ as the difference between the currents are obtained by the adder 33 and the subtractor 32, respectively.

The load current $i_u$ is checked with a command value therefor $i_u^*$ in the subtractor 34 and the output therefrom is amplified in the amplifier 38 and the phase voltage command value $V_u^*$ common to both of the inverters INV. a and INV. b is output therefrom.

Meanwhile, the circulating current $i_{uc}$ is multiplied by the gain in the gain control 37 and the output thereof is subtracted from the aforesaid phase voltage command value $V_u^*$ in the subtractor 35 and added thereto in the adder 36, and thereby, phase-U voltage command values $V_{ua}^*$, $V_{ub}^*$ for the inverters INV. a, INV. b are output, respectively.

The U-phase voltage command values $V_{ua}^*$, $V_{ub}^*$ are compared with the triangular carrier $e_c$ in the comparators 39, 40 as shown in FIG. 8, and the outputs thereof are passed either directly through the on-delay circuit 43, 45, or after being logically inverted by the negative logical element 41, 42, through the on-delay circuit 44, 46, the on-delay circuits being provided for preventing the arm from shorting due to simultaneous firing of the switches 108a and 109a or 108b and 109b.

These outputs become the firing signal $SW_{ua}$, $SW_{xa}$ for the switches 108a, 109a or the firing signal $SW_{ub}$, $SW_{xb}$ for the switches 108b, 109b to generate the midpoint voltage $V_u$ of the interphase reactor and the voltage $V_{uc}$ across the interphase reactor as shown in FIG. 5.

The load terminal voltage (the midpoint voltage of the interphase reactor) $V_u$ and the voltage $V_{uc}$ across the interphase reactor are, when the potential at the point N in the D.C. circuit is taken as zero, expressed as $$V_u = (V_{ua} + V_{ub})/2 \tag{1}$$

$$V_{uc} = V_{ua} - V_{ub} \tag{2}$$

According to the above description, we obtain $$V_{ua}^* = V_u^* - ki_{uc} \tag{3}$$

$$V_{ub}^* = V_u^* + ki_{uc} \tag{4}$$

Further, by substituting equations (3), (4) for equations (1), (2), with the condition underlying the pulse width modulation: average value of voltages during a carrier period = the voltage command value, i.e., $$V_{ua} \triangleq v_{ua}^* \tag{5}$$

$$V_{ub} \triangleq v_{ub}^* \tag{6}$$

taken into consideration, we obtain $$V_u \triangleq v_u^* \tag{7}$$

$$V_{uc} \triangleq -2k\, i_{uc} \tag{8}$$

From equation (7), the load terminal voltage $V_u$ is controlled to be equal to the common voltage command value $V_u^*$ (to be equal to the average voltage during the carrier period), and therefore, the load current becomes controllable.

And from equation (8) above, it is shown that the circulating current $i_{uc}$ and the voltage $V_{uc}$ developed across the interphase reactor are opposite in polarity, and so, it follows that increase in the circulating current $i_{uc}$ is fed back through the voltage $V_{uc}$ developed across the interphase reactor to produce the effect in the direction to reduce the circulating current $i_{uc}$, that is the result to reduce the circulating current $i_{uc}$ to an extremely small value as shown in FIG. 8 can be obtained. Thus, control of the load current $i_u$ and control of the circulating current $i_{uc}$ can be independently executed without any interference with each other.

Although the above mentioned embodiment has been described as an arrangement in an analog system, the same may be of a system utilizing a microprocessor and digital circuits. And, the sample and hold 49 may be constructed of an up/down counter, which is capable of performing up/down operations in the direction to meet equation (8) according to the polarity of the circulating current $i_{uc}$ thereby to form the u-phase voltage command $V_{ua}^*$, $V_{ub}^*$. The phase of the output may be either single phase or polyphase.

According to the present invention as described so far, since the load current control and the circulating current control are arranged to be executed independently, it has become possible, even when relatively small interphase reactors are used, to perform quick control of the load current with the circulating current limited to a small quantity. So that, such effects are obtained that the apparatus can be made smaller, less costly, and yet to provide larger capacity.

What is claimed is:

1. A PWM control apparatus for an interphase reactor multiplex inverter having output terminals of its two inverters connected with each other through interphase reactors so as to provide parallel multiplex three phase output from midpoints of the interphase reactors, said PWM control apparatus comprising:
   (a) generation means of common phase voltage command value for generating phase voltage command value common to both said inverters based on the sum of output currents of said inverters in the same phase;
   (b) generation means of individual phase voltage command value for generating phase voltage command values for individual inverters based on the difference between output currents of said inverters in the same phase; and
   (c) firing signal generation means for generating firing signals for said individual inverters based on said individual phase voltage command values and a triangular carrier.

2. A PWM control apparatus according to claim 1, wherein said generation means of common phase voltage command value consists of an adder for adding output currents in each phase and a subtractor for checking the load current output from said adder with a command value for the same.

3. A PWM control apparatus according to claim 1, wherein said generation means of individual phase voltage command value consists of a first subtractor for checking the output currents in each phase with each other, a gain control for multiplying the circulating current output from said subtractor by its gain, a sample and hold connected to the output of said gain control, a second subtractor for checking the output of said sample and hold with the phase voltage command value from said generation means of common phase voltage command value, and an adder for adding the output of said sample and hold to said phase voltage command value.

4. A PWM control apparatus according to claim 3, wherein said sample and hold is an up/down counter.

5. A PWM control apparatus according to claim 1, wherein said firing signal generation means consists of a triangular carrier generator, a first and a second comparator for comparing the output of said carrier generator with each of the phase voltage command values from said generation means of individual phase voltage command value, a first and a second logical element for logically inverting each of the outputs of said first and second comparators, and first to fourth on-delay circuits for preventing arms from shorting connected to the outputs of said first and second comparators and said first and second logical elements.

* * * * *

UNITED STATES PATENT AND TRADEMARK OFFICE
CERTIFICATE OF CORRECTION

PATENT NO. : 4,802,079
DATED : January 31, 1989
INVENTOR(S) : SHOJI MIZUGUCHI

It is certified that error appears in the above-identified patent and that said Letters Patent is hereby corrected as shown below:

```
Col. 1, line 15, after "between" insert --the--.

Col. 3, line 41, after "and" insert --FIGS. 5-8--;
Col. 3, line 52, "te" should be --the--.
Col. 5, line 7, "v" should be --V--;
Col. 5, line 9, "v" should be --V--;
Col. 5, line 13, "v" should be --V--.
```

Signed and Sealed this

Thirtieth Day of October, 1990

Attest:

HARRY F. MANBECK, JR.

*Attesting Officer*     *Commissioner of Patents and Trademarks*